US006448334B1

(12) United States Patent
Verhoogt et al.

(10) Patent No.: US 6,448,334 B1
(45) Date of Patent: Sep. 10, 2002

(54) TRANSLUCENT POLYCARBONATE COMPOSITION, METHOD FOR PREPARATION THEREOF, AND ARTICLES DERIVED THEREFROM

(75) Inventors: Hendrik Verhoogt, Bergen op Zoom; Gabrie Hoogland, Breda; Mark van Heeringen; Bart Peter Gerard Hendrix, both of Bergen op Zoom, all of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/740,589

(22) Filed: Dec. 19, 2000

(51) Int. Cl.$^7$ .......................... C08L 69/00; C08L 67/02
(52) U.S. Cl. .................. 525/67; 525/133; 525/148; 525/439; 524/133; 524/140; 524/147; 524/414; 524/417
(58) Field of Search ................... 525/67, 133, 148, 525/439; 524/133, 140, 147, 414, 417

(56) References Cited

U.S. PATENT DOCUMENTS

| | | | |
|---|---|---|---|
| 2,465,319 A | 3/1949 | Whinfield et al. |
| 2,675,390 A | 4/1954 | Rosenblatt |
| 2,888,484 A | 5/1959 | Dehm et al. |
| 3,305,520 A | 2/1967 | Fritz et al. |
| 3,404,135 A | 10/1968 | Tietz |
| 3,444,237 A | 5/1969 | Jaffe |
| 3,461,108 A | 8/1969 | Heilman et al. |
| 3,476,627 A | 11/1969 | Squires |
| 3,560,456 A | 2/1971 | Hazen et al. |
| 3,565,985 A | 2/1971 | Schrenk et al. |
| 3,635,895 A | 1/1972 | Kramer |
| 3,668,288 A | 6/1972 | Takahashi |
| 3,918,865 A | 11/1975 | Nissel |
| 3,933,730 A | 1/1976 | Hoogeboom |
| 3,933,964 A | 1/1976 | Brooks |
| 4,001,184 A | 1/1977 | Scott |
| 4,076,698 A | 2/1978 | Anderson et al. |
| 4,118,370 A | * 10/1978 | Sannes |
| 4,128,607 A | 12/1978 | Shiomura et al. |
| 4,220,583 A | 9/1980 | Mark |
| 4,252,916 A | 2/1981 | Mark |
| 4,302,566 A | 11/1981 | Karol et al. |
| 4,354,009 A | 10/1982 | Goeke et al. |
| 4,401,804 A | 8/1983 | Wooten et al. |
| 4,410,662 A | 10/1983 | Witman et al. |
| 4,477,521 A | 10/1984 | Lehmann et al. |
| 4,477,632 A | 10/1984 | Mark |
| 4,532,290 A | 7/1985 | Jaquiss et al. |
| 4,559,388 A | * 12/1985 | Liu |
| 4,564,658 A | 1/1986 | Liu |
| 4,628,074 A | * 12/1986 | Boutni |
| 4,663,391 A | 5/1987 | Boutni |
| 4,707,393 A | 11/1987 | Vetter |
| 4,754,064 A | 6/1988 | Lillwitz |
| 4,763,133 A | 8/1988 | Takemura et al. |
| 4,786,692 A | * 11/1988 | Allen |
| 4,873,277 A | 10/1989 | Boutni |
| 5,239,001 A | 8/1993 | Fischer et al. |
| 5,354,791 A | 10/1994 | Gallucci |
| 5,360,861 A | 11/1994 | Campbell |
| 5,441,997 A | 8/1995 | Walsh et al. |
| 5,478,896 A | * 12/1995 | Scott |
| 5,608,027 A | 3/1997 | Crosby et al. |
| 5,847,041 A | 12/1998 | Takemura et al. |
| 5,907,026 A | 5/1999 | Factor et al. |
| 5,922,816 A | 7/1999 | Hamilton |
| 5,986,040 A | 11/1999 | Patel et al. |
| 6,060,538 A | 5/2000 | Gallucci |
| 6,084,055 A | 7/2000 | Brunelle et al. |

FOREIGN PATENT DOCUMENTS

| | | |
|---|---|---|
| EP | 0 004 645 B2 | 10/1979 |
| EP | 0 604 130 B1 A2 A3 | 6/1994 |
| WO | 99/63002 | * 12/1999 |
| WO | WO 00/27927 | 5/2000 |

OTHER PUBLICATIONS

"New Route to Low–Density Polyethylene" *Chemical Engineering*, pp. 80–85 (Dec. 3, 1979).

"Olefin Polymers" *Encyclopedia of Polymer Science and Technology*, John Wiley and Sons, Inc. vol. 9, pp. 440–460 (1965).

Freifelder, et al. "Low–Pressure Hydrogenation of Some Benzenepolycarboxylic Acids with Rhodium Catalyst" *Journal of Organic Chemistry* vol. 31, pp. 3438 ff. (1966).
Abstract of J05017599, J06306266, J09048911.

* cited by examiner

*Primary Examiner*—David J. Buttner

(57) ABSTRACT

Translucent polycarbonate compositions include an aromatic polycarbonate, a cycloaliphatic polyester, and a polyolefin. The compositions have excellent optical characteristics and superior physical properties, particularly low-temperature impact strength, compared to translucent polycarbonate-polyester blends requiring inorganic fillers.

24 Claims, No Drawings

TRANSLUCENT POLYCARBONATE COMPOSITION, METHOD FOR PREPARATION THEREOF, AND ARTICLES DERIVED THEREFROM

BACKGROUND OF THE INVENTION

The present invention relates to a thermoplastic composition comprising aromatic polycarbonate. In particular, the invention relates to a translucent polycarbonate composition having excellent physical properties.

Aromatic polycarbonates are engineering thermoplastics that combine desirable mechanical, optical, thermal, and electrical properties. When extruded in sheet form, aromatic polycarbonates have high transparency and excellent impact strength, making them ideal for a variety of glazing applications including roofs, greenhouses, sunrooms, and swimming pool enclosures. For structures in hot climates or for the southern exposure of structures in various climates, it is often desirable to use polycarbonate sheets having reduced light transmission in the form of opal whiteness and/or translucency.

It is known in the art that polycarbonate resins can be rendered translucent by the use of one or more inorganic additives such as titanium dioxide, zinc oxide, zinc sulfide, lead carbonate, and barium sulfate (see, for example, U.S. Pat. No. 4,252,916 to Mark, and Japanese Unexamined Patent Publication Nos. JP 06-306266 and JP 09-048911). It is also known to make polycarbonate translucent via addition of a partially fluorinated polyolefin (see, for example, U.S. Pat. No. 4,252,916 to Mark), a polyolefinic resin in combination with a plasticizer (see, for example, Japanese Unexamined Patent Publication JP 05-017599A), poly (dimethylsiloxane) gum in combination with finely divided silica (see, for example, U.S. Pat. No. 3,933,730 to Hoogeboom), poly(methyl silsesquioxane) (see, for example, European Patent No. 604,130 to Ohtsuka et al.), or spherical transparent thermoplastic particles (see, for example, International Publication No. WO 00/27927).

Of the above methods, the addition of light-scattering pigments, such as barium sulfate or calcium carbonate, is presently favored for commercial production of translucent polycarbonate compositions. However, the addition of such inorganic pigments adversely affects the physical properties of the sheet, especially its low temperature impact strength.

There remains a need for translucent polycarbonate formulations with improved low temperature impact strength.

BRIEF SUMMARY OF THE INVENTION

A translucent polycarbonate composition comprises:

about 60 to about 99.8 weight percent of an aromatic polycarbonate;

about 0.1 to about 30 weight percent of a cycloaliphatic polyester;

about 0.1 to about 8 weight percent of a polyolefin;

wherein the molded or extruded composition has a transmission of about 15% to about 65% at a thickness of 2.0 mm according ASTM D-1003; and wherein all weight percentages are based on the weight of the total composition.

DETAILED DESCRIPTION OF THE PREFERRED EMBODIMENTS

Translucency and high impact strength are provided by a thermoplastic composition comprising:

about 60 to about 99.8 weight percent of an aromatic polycarbonate;

about 0.1 to about 30 weight percent of a cycloaliphatic polyester;

about 0.1 to about 8 weight percent of a polyolefin;

wherein the molded or extruded composition has a transmission of about 15% to about 65% at a thickness of 2.0 mm according ASTM D-1003; and wherein all weight percentages are based on the weight of the total composition.

The inventors have discovered that polyolefins are especially suited for reducing the transparency of blends of aromatic polycarbonate and cycloaliphatic polyester while improving the low temperature impact strength of those blends compared to formulations relying on inorganic pigments for translucency. While polyolefins have sometimes been employed as impact modifiers in polycarbonate compositions, it should be noted that other types of impact modifiers, including methacrylate-butadiene-styrene (MBS) copolymers and styrene-(ethylene-butylene)-styrene block copolymers, have been found by the present inventors to be unsuitable for the present compositions because they do not provide the necessary reduction in transmittance at a similar concentration. It is therefore especially surprising that the desirable combination of properties is provided by the blends comprising polyolefins.

As used herein, the terms "polycarbonate" and "aromatic polycarbonate" include compositions having structural units of the formula

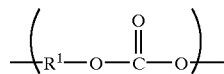

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula

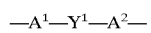

wherein each of $A^1$ and $A^2$ is a monocyclic divalent aryl radical having from 6 to 12 carbon atoms and $Y^1$ is a bridging radical having one or two bridging atoms that separate $A^1$ from $A^2$. In an exemplary embodiment, one atom separates $A^1$ from $A^2$. Illustrative, non-limiting examples of radicals of this type are —O—, —S—, —S(O)—, —S(O)$_2$—, —C(O)—, methylene, cyclohexylmethylene, 2[2,2,1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Preferred dihydroxy compounds include those in which only one atom separates $A^1$ and $A^2$. As used herein, the term "dihydroxy compound" includes, for example, bisphenol compounds having the formula

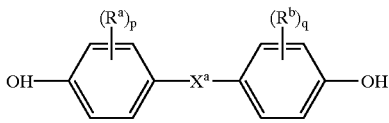

wherein $R^a$ and $R^b$ each represent a halogen atom or a monovalent hydrocarbon group and may be the same or different; p and q are each independently integers from 0 to 4; and $X^a$ represents one of the groups of the formula

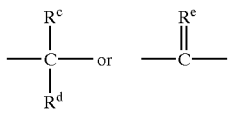

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include dihydric phenols and the dihydroxy-substituted aromatic hydrocarbons disclosed by name or formula (generic or specific) in U.S. Pat. No. 4,217,438 to Brunelle et al. A nonexclusive list of specific examples of the types of bisphenol compounds includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl) octane; 1,1-bis(4-hydroxyphenyl)propane; 1,1-bis(4-hydroxyphenyl)-n-butane; bis(4-hydroxyphenyl)phenylmethane; 2,2-bis(4-hydroxy-1-methylphenyl) propane; 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl)cyclopentane; and bis(hydroxyaryl)cycloalkanes such as 1,1-bis(4-hydroxyphenyl)cyclohexane; and the like, as well as combinations comprising at least one of the foregoing.

Aromatic polycarbonate resins typically are prepared by reacting the dihydroxy compound with a carbonate precursor, such as phosgene, a haloformate or a carbonate ester and generally in the presence of an acid acceptor and a molecular weight regulator. These aromatic polycarbonates can be manufactured by known processes, such as, for example, by reacting a dihydroxy compound with a carbonate precursor, in accordance with methods set forth in the literature including the interfacial polymerization and melt polymerization processes. Generally in the melt polymerization process, the dihydroxy compound is reacted with a diester carbonate such as diphenyl carbonate, whereas in the interfacial polymerization the dihydroxy compound is reacted with a carbonyl chloride such as phosgene.

It is also possible to employ aromatic polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have from 2 to about 40 carbons. A preferred aliphatic diacid is dodecanedioic acid. Polyarylates and polyester-carbonate resins or their blends can also be employed. Branched polycarbonates are also useful, as well as blends comprising a linear polycarbonate and a branched polycarbonate. The branched polycarbonates may be prepared by adding a branching agent during polymerization.

These branching agents are well known and may comprise polyfunctional organic compounds containing at least three functional groups, which may be hydroxyl, carboxyl, carboxylic anhydride, haloformyl and mixtures comprising at least one of the foregoing. Specific examples include trimellitic acid, trimellitic anhydride, trimellitic trichloride, tris-p-hydroxy phenyl ethane, isatin-bis-phenol, tris-phenol TC (1,3,5-tris( (p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid and benzophenone tetracarboxylic acid, and the like. The branching agents may be added at a level of about 0.05 to about 2.0 weight percent. Branching agents and procedures for making branched polycarbonates are described in U.S. Pat. Nos. 3,635,895 and 4,001,184. All types of polycarbonate end groups are contemplated as being within the scope of the present invention.

Preferred aromatic polycarbonates are based on bisphenol A, in which each of $A^1$ and $A^2$ is p-phenylene and $Y^1$ is isopropylidene. Preferably, the weight average molecular weight of the polycarbonate is about 5,000 to about 200,000, more preferably about 10,000 to about 100,000 and still more preferably about 15,000 to about 35,000.

The aromatic polycarbonate may be present at about 60 to about 99.8 weight percent, based on the total weight of the composition, with about 85 to about 98 weight percent being preferred, and about 90 to about 97.5 weight percent being more preferred.

The cycloaliphatic polyester resin comprises a polyester having repeating units of the formula

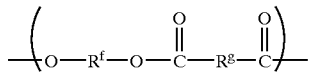

where at least one $R^f$ or $R^g$ is a cycloalkyl containing radical.

The polyester is a condensation product where $R^f$ is the residue of an aryl, alkane or cycloalkane containing diol having 6 to 20 carbon atoms or chemical equivalent thereof, and $R^g$ is the decarboxylated residue derived from an aryl, aliphatic or cycloalkane containing diacid of 6 to 20 carbon atoms or chemical equivalent thereof with the proviso that at least one $R^f$ or $R^g$ is cycloaliphatic. Preferred polyesters of the invention will have both $R^f$ and $R^g$ cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are necessary to impart good rigidity to the polyester and to allow the formation of transparent blends due to favorable interaction with the polycarbonate resin.

The polyester resins are typically obtained through the condensation or ester interchange polymerization of the diol or diol equivalent component with the diacid or diacid chemical equivalent component.

$R^f$ and $R^g$ are preferably cycloalkyl radicals independently selected from the following formulas:

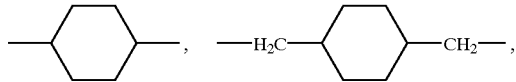

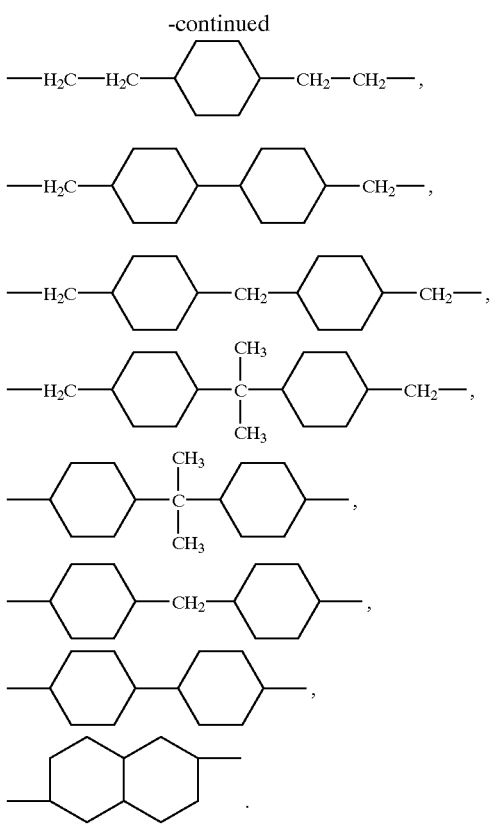

The preferred cycloaliphatic radical $R^g$ is derived from the 1,4-cyclohexyl diacids and most preferably greater than 70 mole % thereof in the form of the trans isomer. The preferred cycloaliphatic radical $R^f$ is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 20 carbon atoms. Examples of such diols include but are not limited to ethylene glycol; propylene glycol, i.e., 1,2- and 1,3-propylene glycol; butanediol, i.e. 1,3- and 1,4-butanediol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component. Chemical equivalents to the diols include esters, such as dialkylesters, diaryl esters and the like.

When using cycloaliphatic diol components, a mixture of cis- and trans isomers may be employed, the ratio ranging from about 1:1 to about 1:5, and further a high trans isomer content (>70%) is most preferred. Mixtures of diols or chemical equivalents of the diols including esters and ethers, such as dialkyl esters, diaryl esters, and the like can also be useful.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cycloaliphatic or bicycloaliphatic diacids having from 6 to 20 carbon atoms, for example 1,4-cyclohexanedicarboxylic acid and especially is trans-1,4-cyclohexanedicarboxylic acid or chemical equivalent. Other cycloaliphatic acids include decahydronaphthalene dicarboxylic acid, norbornene dicarboxylic acids, bicyclooctane dicarboxylic acids. Mixtures of cycloaliphatic diacids and linear aliphatic diacids are also useful provided the polyester has at least one monomer containing a cycloaliphatic ring. Illustrative examples of linear aliphatic diacids are succinic acid, adipic acid, dimethyl succinic acid, and azelaic acid.

Cyclohexanedicarboxylic acids and their chemical equivalents can be prepared, for example, by the hydrogenation of cycloaromatic diacids and corresponding derivatives such as isophthalic acid, terephthalic acid or naphthalene dicarboxylic acids in a suitable solvent such as water or acetic acid at room temperature and at atmospheric pressure using suitable catalysts such as rhodium supported on a suitable carrier of carbon or alumina. See, Friefelder et al., *Journal of Organic Chemistry*, volume 31, pages 3438 ff. (1966); and U.S. Pat. Nos. 2,675,390 and 4,754,064. They may also be prepared by the use of an inert liquid medium in which a phthalic acid is at least partially soluble under reaction conditions and a catalyst of palladium or ruthenium in carbon or silica. See, U.S. Pat. Nos. 2,888,484 and 3,444,237.

Typically, during hydrogenation, two or more isomers are obtained in which the carboxylic acid groups are in cis- or trans-positions. The cis- and trans-diastereomers can be separated by crystallization with or without a solvent, for example, n-heptane, or by distillation. The cis-isomer tends to blend better; however, the trans-diastereomer has higher melting and crystallization temperatures and is especially preferred. Mixtures of the cis- and trans-diastereomers are useful herein as well, and preferably when such a mixture is used, the trans-isomer will comprise at least about 70 parts by weight and the cis-isomer will comprise the remainder based upon 100 parts by weight of cis- and trans-isomers combined. A mixture of diastereomers or more than one diacid may be used in the cycloaliphatic polyester resins of this invention.

Chemical equivalents of these diacids include esters, alkyl esters (e.g. dialkyl esters), diaryl esters, anhydrides, acid chlorides, acid bromides, salts, and the like. The preferred chemical equivalents comprise the dialkyl esters of the cycloaliphatic diacids, and the most preferred chemical equivalent comprise the dimethyl ester of the acid, particularly dimethyl-trans-1,4-cyclohexanedicarboxylate.

Dimethyl-1,4-cyclohexanedicarboxylate can be obtained by ring hydrogenation of dimethyl terephthalate, and two diastereomers having the carboxylic acid groups in the cis- and trans-positions are obtained. The diastereomers can be separated, the trans-isomer being especially preferred. Mixtures of the isomers are suitable as explained above and preferably in the ratios as explained above.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has the formula:

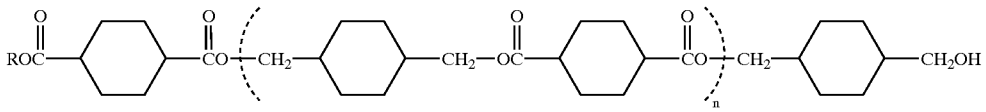

With reference to the previously set forth general formula, for PCCD, $R^f$ is derived from 1,4 cyclohexane dimethanol; and $R^g$ is a cyclohexane ring derived from cyclohexanedicarboxylate or a chemical equivalent thereof. The favored PCCD has a cis/trans formula.

Preferred cycloaliphatic polyesters will have weight average molecular weights (determined by gel permation chromatography using polystyrene standards) of about 30,000 to about 150,000 atomic mass units (amu), with about 60,000 to about 100,000 amu being preferred, and about 65,000 to about 95,000 amu being more preferred. Preferred cycloaliphatic polyesters will also have viscosities of about 500 to about 25,000 poise, with about 1,000 to about 20,000 poise being preferred, and about 2,000 to about 4,000 poise being more preferred.

The preferred aliphatic polyesters used in the present transparent/translucent molding compositions have a glass transition temperature ($T_g$) which is above 50° C., more preferably above 80° C. and most preferably above about 100° C.

Cycloaliphatic polyesters are commercially available from, for example, Eastman Chemical. Alternatively, cycloaliphatic polyesters can be synthesized following the teachings of, for example, U.S. Pat. Nos. 2,465,319, 5,986,040, and 6,084,055. The reaction is generally run in the presence of a suitable catalyst, such as tetraisopropyl titanate or tetrakis(2-ethyl hexyl)titanate, in a suitable amount, typically about 50 to 200 ppm of titanium based upon the final product.

The cycloaliphatic polyester may be present at about 0.1 to about 30 weight percent, based on the total weight of the composition, with about 1 to about 15 weight percent being preferred, and about 1 to about 10 weight percent being more preferred.

Polyolefins suitable for the composition include homopolymers and copolymers. Preferred polyolefins include those derived from monomers containing from 2 to about 10 carbon atoms. Some illustrative non-limiting examples of these polyolefins include polyethylene, polypropylene, polybutylene, polyhexene, polyisobutylene, and ethylenepropylene copolymer.

In one embodiment the polyolefin is free of fluoride substituents. In another embodiment, the polyolefin is free of all halide substituents (that is, all substituents from Group VIIA of the periodic table).

Methods for the preparation of the polyolefins are abundantly described in the literature and are well known to those skilled in the art. Polyethylene, for example, can be prepared by various procedures using cationic, anionic or free radical initiating catalysts, with conditions varied to produce a range of molecular weights and densities and various degrees of branching or non-branching. In one procedure, which involves free radical initiation, ethylene gas is polymerized in the presence of a peroxide initiating catalyst at a pressure between 15,000 and 40,000 pounds per square inch (psi) and a temperature between 100° C. and 200° C. to produce a relatively low density polymer, for example 0.90 to 0.94 g/cm³.

The polyethylene can also be prepared by low pressure processes to obtain a polymer of higher molecular weight and a higher density. In one such procedure, known as the Phillips process, ethylene is contacted in an inert solvent slurry of a catalyst such as chromium oxide supported on silica-aluminum, at pressures of 400 to 500 psi and temperatures of 130° to 170° C., followed by extraction of the polymer with hot solvent and purification, to produce a polyethylene product having a density between 0.96 to 0.97 g/cm³. Still other procedures are possible, such as emulsion polymerization in aqueous media in the presence of a peroxy compound, as well as suspension polymerization at low temperatures using a silver salt-peroxide redox system.

Another suitable polyolefin is polypropylene, a common commercial form of which is isotactic polypropylene. Such polymers can be prepared by anionically initiated reactions using Ziegler type catalysts, for example titanium halide such as $TiCl_4$ in combination with an organometallic co-catalyst such as trialkyl aluminum halide. Polymerization proceeds readily at temperatures between 25° C. and 100° C. to yield a polymer in the form of a slurry of insoluble granular powder.

Copolymers of ethylene and propylene can be prepared using procedures similar to those for polyethylene and other polyolefins; for instance by the polymerization reaction of a mixture of ethylene and propylene in the presence of a Ziegler type catalyst or by free-radical initiation under high pressures.

Examples of higher polyolefins are polymers based on 2-methyl-1-butene, 1-pentene, 4-methyl-1-pentene, and the like. They can be prepared by known procedures including those described in Encyclopedia of Polymer Science and Technology, John Wiley & Sons, Inc., Vol. 9, pp. 440–460, 1965, incorporated herein by reference.

Particularly preferred polyolefins include linear low density polyethylenes (LLDPE). Linear low density polyethylenes are well known materials that are available commercially, for example, from Exxon under the tradename ESCORENE® or from Dow Chemicals under the tradename DOWLEX®. Alternatively, they may readily be prepared by state of the art polymerization processes such as those described in U.S. Pat. Nos. 4,128,607, 4,354,009, 4,076,698, and European Patent Application No. 4645 (published Oct. 17, 1979). These polymers have a density between about 0.92 and 0.96 gram/milliliter. These linear low density polyethylene polymers are actually co-polymers of ethylene and a minor amount, typically less than 20 mole percent, preferably less than 15 mole percent, of an alpha olefin of 3 to 18 carbon atoms, preferably 3 to 10 carbon atoms, more preferably 4 to 8 carbon atoms. These linear low density polyethylenes are distinguishable from polymers such as high pressure low density polyethylene and high density polyethylene made from Zeigler catalyst systems in that they are substantially free of side chain branching, having a controlled concentration of simple side chain branching as opposed to random branching.

The preferred linear low density polyethylene co-polymers are prepared from ethylene and one or more alpha olefins selected from the group consisting of propylene, 1-butene, 1-pentene, 4-methyl-1-pentene, 1-hexene, and 1-octene, most preferably 1-butene and 1-octene. Polymers of desired density may be obtained by controlling the co-polymerization ratio of ethylene to alpha olefin during co-polymerization. The addition of increasing amounts of the co-monomers to the co-polymers results in lowering the density of the co-polymer.

The melt indices of useful linear low density polyethylenes may vary widely. However, when using linear low density polyethylene derived from ethylene and a short chain monomer, for example 1-butene, it is preferred that such linear low density polyethylenes have melt indices of at least 5, preferably at least 10, more preferably at least about 12 gram/10 minutes.

With linear low density polyethylenes derived from longer chain monomers, for example 1-octene, the melt indices of the linear low density polyethylenes may be even lower.

In general, the co-polymerization of linear low density polyethylene can take place in either a gas phase fluidized bed reaction or liquid phase solution process reactor, preferably the former, at pressures ranging from normal to 5,000 psi, preferably less than 1,000 psi and at temperatures of from 20° C. to 310° C., preferably 30° C. to 115° C. in the presence of a suitable high activity catalysts. Typical catalyst systems comprise a transition metal complex catalyst, preferably comprising at least one compound of a transition element of group IVB, VB, or VIB having a halide and/or hydrocarbon group attached to said transition metal and a reducing component such as a metal halide or a compound having metal attached directly to carbon, for example metal alkyl. Highly satisfactory catalyst systems comprise (a) a Group IVB or Group VB metal compound bearing at least one halogen atom and (b) a lithium or aluminum or magnesium alkyl compound, especially LiAl(hydrocarbon)4. Such systems include, for example, $TiC_4$ and $LiAl(alkyl)_4$, $VOCl_3$ and Li(alkyl), $MoCl_3$ and $Al(alkyl)_3$, $TiCl_4$ and (alkyl)MgBr, and the like. Catalyst systems such as these as well as other useful catalysts systems are disclosed in U.S. Pat. Nos. 4,128,607, 4,354,009, 4,076,698, and European Patent Application No. 4645. Such catalyst systems are used in a molar ratio of ethylene to catalyst of about 35,000:1 to about 400,000:1.

The preferred linear low density polyethylene co-polymers so produced have an unsaturated group content of less than or equal to about 1, and preferably from about 0.1 to about 0.3 carbon-carbon double bonds per 1000 carbon atoms and a n-hexane extractables content (at 50° C.) of less than about 3, preferably less than about 2, weight percent. Preferred materials include those made by the Unipol process, which is described in *Chem. Eng.*, Dec. 3, 1979, pages 80–85.

Highly preferred polyolefins include polyolefin plastomers. Polyolefin plastomers are substantially linear ethylene/alpha-olefin copolymers. The alpha-olefin monomer preferably has from 4 to 8 carbon atoms. Polyolefin plastomers are characterized by a density of about 0.88 to about 0.92 g/ml, a molecular weight distribution $M_w/M_n$ not greater than about 4 and a melt flow ratio $I_{10}/I_2$ of not less than about 7. The molecular weight distribution $M_w/M_n$ is a ratio of the weight average molecular weight to the number average molecular weight of the copolymer, while the melt flow ratio $I_{10}/I_2$ is a ratio of the melt index at the 10 kg loading to the melt index at the 2.16 kg loading at 190° C. according to ASTM D1238. The polyolefin plastomers are distinguished from other polyolefins, including LLDPE, in Mw/Mn and/or $I_{10}/I_2$.

Suitable polyolefin plastomers include those sold by ExxonMobil under the tradename EXACT® as, for example, the ethylene/butene copolymer EXACT® 4033 having Mw/Mn of about 1.8 and the ethylene/octene copolymer EXACT® 8201 having Mw/Mn of about 2.7; and by Dow Chemical Company under the tradename AFFINITY® as, for example, the ethylene/octene copolymer AFFINITY® PL1880.

Suitable polyolefins include graft copolymers of any of the above polyolefins with unsaturated acids or acid derivatives, including acrylic acid, maleic acid, maleic anhydride, itaconic acid, and the like. These acid-modified polyolefins may be prepared by known methods including those described in, for example, U.S. Pat. Nos. 3,404,135 to W. Tietz, 3,461,108 to Heilman et al., and 3,560,456 to Hazen et al. Especially preferred are the acid-modified polyolefins of linear low density polyethylene and maleic anhydride (LLDPE-g-MAH), which are commercially available from, for example, ExxonMobil under the tradename EXXELOR® (these materials include maleic anhydride-modified copolymers of (a) ethylene and butene, or (b) ethylene and octene); and the acid-modified polyolefin plastomers available from ExxonMobil as, for example, MDEX 95-2 and MDEX 96-2.

The total amount of polyolefin may be about 0.1 to about 8 weight percent, based on the total weight of the composition, with about 0.5 to about 4 weight percent being preferred, and about 1 to about 2.5 weight percent being more preferred. This total amount of polyolefin may preferably comprise 0 to about 100 weight percent, more preferably about 0 to about 50 weight percent, yet more preferably about 20 to about 40 weight percent, acid-modified polyolefin, with the remainder being unmodified polyolefin.

The composition may further comprise a catalyst quencher. Catalyst quenchers, as used herein, are agents that quench any residual polymerization catalyst remaining from the synthesis of the polycarbonate or the cycloaliphatic polyester resin. The residual catalyst needs to be quenched to prevent any transesterification reaction between the polycarbonate and the cycloaliphatic polyester resin. There is no particular limitation on the structure of the quencher. Suitable transesterification quenchers include mono-, di-, and tri-hydrogen phosphites and their metal salts; mono-, di-, and tri-hydrogen phosphates and their metal salts; mono- and di-hydrogen phosphonates and their metal salts; pyrophosphates and their metal salts; mixtures comprising at least one of the foregoing quenchers; and the like. The suitability of a particular compound for use as a transesterification quencher and the determination of how much is to be used may be readily determined by preparing a mixture of the cycloaliphatic polyester and the aromatic polycarbonate with and without the particular transesterification quencher and determining the effect on melt viscosity, gas generation or color stability or the formation of interpolymer.

The mono-, di-, and tri-hydrogen phosphites and their metal salts have the formula

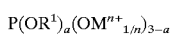

wherein each $R^1$ is independently $C_1$–$C_{12}$ alkyl, $C_1$–$C_{12}$ aryl, or $C_1$–$C_{18}$ alkylaryl; each M is independently hydrogen or a metal atom selected from Group IA, IIA, IB, or IIB of the periodic table; a is 0–2; and n is 1 or 2. Preferred compounds in this class include phosphorous acid, $H_3PO_3$.

The mono-, di-, and tri-hydrogen phosphates and their metal salts have the formula

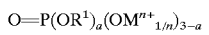

wherein $R^1$, M, a, and n are as defined for the phosphites above. Preferred compounds in this class include those in which a=0 and M is a metal atom selected from Group IB or IIB of the periodic table. A preferred compound is mono zinc phosphate (MZP; $ZnHPO_4$).

The mono- and di-hydrogen phosphonates and their metal salts have the formula $$P(R^1)(OR^1)_b(OM^{n+}{}_{1/n})_{2-b}$$

wherein $R^1$, M, and n are defined as above, and b=0 or 1.

The pyrophosphates and their metal salts have the formula $$M^z{}_xH^yP^qO_{3q+1}$$

wherein M is as defined for the phosphites above, x is 1–12, y is 1–12, q is 2–10, and z is 1–5, with the proviso that the sum (xz)+y is equal to q+2. M is preferably a Group IA or IIA metal. Preferred compounds in this class include $Na_3HP_2O_7$; $K_2H_2P_2O_7$; $KNaH_2P_2O_7$; and $Na_2H_2P_2O_7$. The particle size of the polyacid pyrophosphate should be less than 75 micrometers, preferably less than 50 micrometers and most preferably less than 20 micrometers.

These and other quenchers, including quencher mixtures, are described, for example, in U.S. Pat. Nos. 4,401,804 to Wooten et al., 4,532,290 to Jaquiss et al., and 5,354,791 to Gallucci, 5,441,997 to Walsh et al., 5,608,027 to Crosby et al., and 5,922,816 to Hamilton.

As mentioned above, the determination of how much of a particular quencher is to be used may be readily determined by preparing the composition with and without the particular compound and determining the effect on melt viscosity, gas generation or color stability or the formation of interpolymer. Typical quencher amounts are about 0.001 to about 2 weight percent, preferably about 0.005 to about 1 weight percent, more preferably about 0.01 to about 0.5 weight percent.

Various other additives may be used alone or in combination. As used herein, additives may include such materials as whitening agents, thermal stabilizers, antioxidants, light stabilizers, plasticizers, colorants, impact modifiers, extenders, antistatic agents, mold releasing agents, additional resins, blowing agents, and processing aids. The different additives that can be incorporated in the compositions are commonly used and known to one skilled in the art. Illustrative descriptions of such additives may be found in R. Gachter and H. Muller, Plastics Additives Handbook, 4th edition, 1993.

Examples of thermal stabilizers include triphenyl phosphite, tris-(2,6-dimethylphenyl)phosphite, tris-(2,4-di-t-butyl-phenyl) phosphite, tris-(mixed mono-and di-nonylphenyl)phosphite, dimethylbenzene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octylphenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agents include glycerol monostearate, sodium stearyl sulfonate, and sodium dodecylbenzenesulfonate. Examples of mold releasing agents include pentaerythritol tetrastearate, stearyl stearate, beeswax, montan wax, and paraffin wax. Examples of other resins include but are not limited to polypropylene, polystyrene, polymethyl methacrylate, and polyphenylene oxide. Combinations of any of the foregoing additives may be used. Such additives may be mixed at a suitable time during the mixing of the components for forming the composition.

In one embodiment, the composition is substantially free of inorganic fillers. By this it is meant that the composition comprises less than 2 weight percent, preferably less than 1 weight percent, more preferably 0 weight percent, of inorganic fillers. Inorganic fillers may include particulate fillers, such as barium sulfate, and fibrous fillers, such as glass fibers. Various other fillers, including particulate, plate-shaped, and fibrous fillers, are described, for example, in U.S. Pat. No. 4,763,133 to Takemura et al. While the composition is generally free of inorganic materials that function primarily as fillers, it may comprise small amounts, typically less than about 1 weight percent, preferably less than about 0.5 weight percent, more preferably less than about 0.25 weight percent, of insoluble whiteners or colorants, which function primarily to adjust the color of the composition. Such insoluble colorants are described in R. Gachter and H. Muller, Plastics Additives Handbook, 4th edition, 1993.

In an alternative embodiment, inorganic fillers may be present in an amount that contributes significantly to reducing the transmission or increasing the haze of the composition.

The production of the compositions may utilize any of the blending operations known for the blending of thermoplastics, for example blending in a kneading machine such as a Banbury mixer or an extruder. The sequence of addition is not critical but all components should be thoroughly blended.

To prepare the resin composition, the components may be mixed by any known methods. Typically, there are two distinct mixing steps: a premixing step and a melt mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

In a preferred embodiment, the composition will have a melt volume rate measured at 300° C./1.2 kg according to ISO 1133 of about 7 mL/10 minutes to about 13 mL/10 minutes, preferably about 9 mL/10 minutes to about 12 mL/10 minutes. In another preferred embodiment, the composition after molding or extruding will exhibit at least one of (1) a transmission measured on a 2.0 mm thick plaque according to ASTM D1003 of about 15% to about 65%, preferably about 20% to about 55%, more preferably about 30% to about 45%; (2) a haze measured on a 2.0 mm thick plaque according to ASTM D1003 not less than about 90%, preferably not less than about 95%, more preferably not less than about 98%; (3) a yellowness index measured for 2.0 mm samples according to ASTM D1925 not greater than about 35, preferably not greater than about 30, more preferably not greater than about 25; (4) an Izod notched impact measured at 0° C. according to ASTM D256 of not less than about 500 J/m, preferably not less than about 700 J/m, more preferably not less than about 800 J/m; (5) an Izod notched impact measured at −20° C. according to ASTM D256 of not less than about 150 J/m, preferably not less than about 200 J/m, more preferably not less than about 400 J/m; and (6) a Flexplate Impact energy at break measured at 23° C. and 3.0 millimeter thickness according to ISO 6603-2 not less than about 100 J, preferably not less than about 110 J, more preferably not less than about 115 J.

The optical properties and impact resistance of the composition make it suitable for use in a variety of applications where translucency is preferred to transparency, including, for example, lighting fixtures, ornaments, and signs. The composition is particularly well adapted for use in a variety of glazing applications including, for example, roofs, greenhouses, sun rooms, swimming pool enclosures, and the like.

The compositions described above may be used in the fabrication of translucent sheets. Techniques for the extrusion of translucent sheets, including solid sheets, multi-wall sheets, and multi-wall sheets comprising hollow bodies, are known in the art and described in, for example, U.S. Pat. Nos. 3,476,627 to Squires, 3,565,985 to Schrenk et al., 3,668,288 to Takahashi, 3,918,865 to Nissel, 3,933,964 to Brooks, 4,477,521 to Lehmann et al., and 4,707,393 to Vetter. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The thickness of the multi-wall sheet is preferably about 4 mm to about 40 mm, while the thickness of the solid sheet is preferably about 1 mm to about 12 mm.

The invention is further illustrated by the following non-limiting examples.

EXAMPLES

The following examples employed the materials listed in Table 1 according to the formulations listed in Tables 2, 4, and 5. All amounts are weight percents based on the total weight of the composition unless otherwise indicated.

All ingredients were mixed in a ribbon blender and extruded on a Leistritz twin screw extruder. Samples comprising polycarbonate and the cycloaliphatic polyester PCCD were extruded at 285° C. to form pellets while compositions comprising polycarbonate but no polyester were extruded at 300° C. Injection molding of the PCCD-containing pellets was performed at 280° C. (mold temperature 80° C.) while pellets with polycarbonate but no polyester were molded at 300° C. (mold temperature 90° C.).

TABLE 1

| Material | Trade name/Source | Properties or Function |
| --- | --- | --- |
| Polycarbonate 1 | GE Plastics | IV = 58–59 ml/g |
| Polycarbonate 2 | GE Plastics | IV = 63.2–65.8 ml/g |
| Poly(alpha-olefin) | DURASYN ® 166/ Amoco | Release agent |
| Tris(2,4-di-t-butylphenyl)phosphite | IRGAFOS ® 168/ Ciba-Ceigy | Heat stabilizer |
| Octadecyl-3-(3,5-di-tert-butyl-4-hydroxyphenyl)propionate | IRGANOX ® 1076/ Ciba-Ceigy | Antioxidant |
| Pentaerythritol tetrakis (3-laurylthiopropionate) | SANDOSTAB ® 4020/ Sandoz | Co-stabilizer (PELTP) |
| Mono zinc phosphate (MZP) | MZP/Berkimpex France | Catalyst quencher |
| $H_3PO_4$ (45% aqueous solution) | Phosphorous acid/ Caldic | Catalyst quencher |
| Poly(cyclohexanedimethanol-1,4-cyclohexanedicarboxylate) | PCCD/Eastman Chemical | $M_w$ = 91000 g/mol (4000 poise) |
| Ethylene-based plastomer | EXACT ® 4033/ Exxon Mobil | Plastomer |

TABLE 1-continued

| Material | Trade name/Source | Properties or Function |
| --- | --- | --- |
| Maleic acid anhydride modified ethylene copolymer | MDEX 95-2 and MDEX 96-2/ Exxon Mobil | Modified plastomer |
| $BaSO_4$ | Portaryte X-15/ Ankerpoort | Inorganic filler/ light diffuser |
| $TiO_2$ (coated) | RL-91/Millenium | White pigment |
| Bis(2,4-di-t-butylphenyl) pentaerythritol diphosphite | ULTRANOX ® 626/ GE Specialty Chemicals | Co-stabilizer |
| Di-(tert-butyl-benzoxazolyl thiophene) | UVITEX ® OB/Ciba-Ceigy | Optical brightener |
| 3,4-epoxycyclohexylmethyl-3,4-epoxycyclohexylcarboxylate | Epoxy ERL4221/ Union Carbide | Cycloaliphatic epoxy |
| 2-(2-hydroxy-5-tert-octylphenyl)-benzotriazole | CYASORB ® UV5411/ Cytec | UV-stabilizer |

Examples 1 and 2, Comparative Example A

Examples 1 and 2 and Comparative Example A were prepared using the materials specified in Table 1 according to the formulations listed in Table 2.

Optical properties (transmission and haze measured according ASTM D1003; yellowness index measured according ASTM D1925) of 2.0 mm thick plaques were measured on a Gardner XL-835 Colorimeter. Notched Izod impact strengths at 23° C., 0° C., and −20° C. were measured on molded impact bars (3.2 mm thick) according to ASTM D256. Flex plate impact was measured at 23° C. on 3.0 millimeter thick plaques according to ISO 6603-2; reported values are the average of 5 test samples for the impact tests. From the granulate the melt volume rate (MVR) was measured according ISO 1133 (300° C./1.2kg) in units of ml/10 min. Glass transition temperature ($T^g$) of granulate was measured on a Perkin-Elmer DSC-7 differential scanning calorimeter. Results are presented in Table 2.

TABLE 2

|  | Example 1 | Example 2 | Comparative Example A |
| --- | --- | --- | --- |
| COMPOSITIONS |  |  |  |
| Polycarbonate 1 | 87.05 | 77.05 | 89.4 |
| Additives (release agent, stabilizer, antioxidant) | 0.8 | 0.8 | — |
| Co-Stabilizer (PELTP) | 0.1 | 0.1 | — |
| EXACT ® 4033 | 1.5 | 1.5 | — |
| MDEX 96-2 | 0.5 | 0.5 | — |
| PCCD 4000 poise | 10 | 20 | — |
| Catalyst Quencher (MZP) | 0.05 | 0.05 | — |
| Color masterbatch containing: |  |  |  |
| Polycarbonate 2 | — | — | 8.517 |
| Co-stabilizer | — | — | 0.106 |
| Optical brightener | — | — | 0.027 |
| Cycloaliphatic Epoxy | — | — | 0.106 |
| UV stabilizer (UV5411) | — | — | 0.106 |
| Barium Sulfate ($BaSO_4$) | — | — | 1.59 |
| Titanium Dioxide ($TiO_2$) | — | — | 0.148 |
| PROPERTIES |  |  |  |
| Transmission | 32.9 | 36.9 | 30.3 |
| Yellowness Index (YI) | 33.0 | 28.9 | 31.4 |
| Haze | 100 | 100 | 100 |
| $T_g$ (° C.) | 138 | 129 | 151 |

TABLE 2-continued

|  | Example 1 | Example 2 | Comparative Example A |
|---|---|---|---|
| Izod Notched Impact Strength at 23° C. (J/m) | 816 | 863 | 900 |
| Izod Notched Impact Strength at 0° C. (J/m) | 808 | 809 | 206 |
| Izod Notched Impact Strength at −20° C. (J/m) | 658 | 154 | 165 |
| Melt Volume Rate at 300° C., 1.2 kg (mL/10 min) | 9.3 | 11.5 | 5.69 |
| Flexplate Impact Maximum Force (N) | 8865 | 8816 | 8697 |
| Flexplate Impact Energy at Max. (J) | 109.0 | 113.5 | 83.6 |
| Flexplate Impact Energy at Break (J) | 113.5 | 119.7 | 91.0 |
| Flexplate Impact Deflection at Break (mm) | 23.1 | 23.3 | 20.7 |

Samples of all 3 formulations exhibited ductile failure performance in flex plate impact testing and Izod notched impact testing at 23° C. Impact testing at 0° C. showed brittle failure for the Comparative Example A while Examples 1 and 2 still exhibited ductile performance.

The results in Table 2 illustrate some of the advantages of the inventive compositions. Versus Comparative Example A, Examples 1 and 2 exhibit higher low-temperature impact strength, higher Flexplate impact strength, and higher melt volume rate (i.e., lower viscosity) while having a similar light transmittance.

Plaques molded of the formulations of Examples 1 and 2 and Comparative Example A were tested for its artificial weathering performance in a Xenon 1200LM apparatus according to ISO 4892 part 2. Values are normalized to the Yellowness Index value (YI-value) at 0 hours (presented in Table 2) and listed in Table 3 as delta YI values. The results show that the PC/CCD/plastomer blends are less yellowing than the comparative example, which contains $BaSO_4$, $TiO_2$, and a UV-stabilizer.

TABLE 3

| | delta YI value | | |
|---|---|---|---|
| Exposure hours | Comparative Example A | Example 1 | Example 2 |
| 0 | 0 | 0 | 0 |
| 45 | 1.6 | 1.8 | 1.5 |
| 69 | 3.3 | 2.9 | 2.3 |
| 159 | 8.9 | 6.4 | 5 |
| 249 | 13.6 | 8.9 | 7.6 |
| 415 | 17 | 12.6 | 11.2 |
| 891 | 22.2 | 16.9 | 15.5 |

Examples 3–7

Examples 3–7 were prepared using the materials specified in Table 1 according to the formulations listed in Table 4. Properties were measured as described above, and results are presented in Table 4.

TABLE 4

|  | Ex. 3 | Ex. 4 | Ex. 5 | Ex. 6 | Ex. 7 |
|---|---|---|---|---|---|
| COMPOSITIONS |  |  |  |  |  |
| Polycarbonate 1 | 87.1 | 87.05 | 93.05 | 88.05 | 83.05 |
| Additives (antioxidant + heat stabilizer + release agent) | 0.8 | 0.8 | 0.8 | 0.8 | 0.8 |
| PELTP | 0.1 | 0.1 | 0.1 | 0.1 | 0.1 |
| Mono zinc phosphate | — | 0.05 | 0.05 | 0.05 | 0.05 |
| PCCD (4000 Poise) | 10 | 10 | 5 | 10 | 15 |
| EXACT ® 4033 | 1.5 | 1.5 | 0.75 | 0.75 | 0.75 |
| MDEX 95-2 | 0.5 | 0.5 | 0.25 | 0.25 | 0.25 |
| PROPERTIES |  |  |  |  |  |
| Izod Notched Impact at 23° C. (J/m) | 852.0 | 823.5 | 857.5 | 827.5 | 848.5 |
| Izod Notched Impact at 0° C. (J/m) | 797.0 | 786.0 | 801.0 | 590.0 | 207.5 |
| Izod Notched Impact at −10° C. (J/m) | 683.5 | 748.1 | 594.5 | 211.0 | 164.5 |
| MVR at 300° C./1.2 kg (mL/10 min) | 8.8 | 11.1 | 9.0 | 10.9 | 12.6 |
| Transmission | 30.9 | 33.3 | 41.6 | 39.3 | 45.9 |
| Haze | 100.3 | 100.4 | 99.9 | 100.1 | 99.8 |
| Yellowness Index (YI) | 50.9 | 127.6 | 124.7 | 27.8 | 19.0 |

From the results in Table 4 it can be seen that an unquenched sample (Example 3) is yellower than a quenched one (Example 4). Examples 5–7 show that higher polyester amounts are associated with lower viscosities (manifested as higher MVR). Also, at a constant level of plastomers, higher polyester amounts are associated with lower impact resistance at 0° C. and −20° C.

Comparative Examples B and C, Examples 8–12

In Table 5 compositions and properties are presented for polycarbonate and polycarbonate/polyester blends comprising barium sulfate ($BaSO_4$) as a light-diffusing agent (Comparative Examples B and C) as well as for polycarbonate/polyester blends comprising polyolefins. Comparative Examples B and C comprising barium sulfate have low impact values at 0° C., −10° C., and −20° C. compared to Examples 8–12 comprising polyolefins. Use of phosphorous acid ($H_3PO_3$; Example 9) instead of mono zinc phosphate (MZP; Example 8) as a catalyst quencher reduces yellowing without affecting the impact strength.

TABLE 5

|  | Comp. Ex. B | Comp. Ex. C | Ex. 8 | Ex. 9 | Ex. 10 | Ex. 11 | Ex. 12 |
|---|---|---|---|---|---|---|---|
| COMPOSITIONS |  |  |  |  |  |  |  |
| Polycarbonate 1 | 89.4 | 78.94 | 88 | 87.99 | 93.44 | 92.94 | 92.44 |
| Antioxidant | — | 0.3 | 0.3 | 0.3 | 0.3 | 0.3 | 0.3 |
| Heat stabilizer | — | 0.1 | 0.1 | 0.1 | 0.1 | 0.1 | 0.1 |

TABLE 5-continued

|  | Comp. Ex. B | Comp. Ex. C | Ex. 8 | Ex. 9 | Ex. 10 | Ex. 11 | Ex. 12 |
|---|---|---|---|---|---|---|---|
| Mono zinc phosphate | — | — | 0.05 | — | — | — | — |
| $H_3PO_4$ (45% in water) | — | 0.06 | — | 0.06 | 0.06 | 0.06 | 0.06 |
| PCCD resin (4000 poise) | — | 10 | 10 | 10 | 5 | 5 | 5 |
| EXACT ® 4033 | — | — | 1.05 | 1.05 | 0.7 | 1.05 | 1.4 |
| MDEX 95-2 | — | — | 0.45 | 0.45 | 0.3 | 0.45 | 0.6 |
| $TiO_2$ coated | — | — | 0.05 | 0.05 | 0.1 | 0.1 | 0.1 |
| Color masterbatch containing: |  |  |  |  |  |  |  |
| Polycarbonate 2 | 8.517 | 8.517 | — | — | — | — | — |
| $TiO_2$ (coated) | 0.148 | 0.148 | — | — | — | — | — |
| $BaSO_4$ | 1.59 | 1.59 | — | — | — | — | — |
| UV-stabilizer | 0.106 | 0.106 | — | — | — | — | — |
| Epoxy | 0.106 | 0.106 | — | — | — | — | — |
| Whitening agent | 0.027 | 0.027 | — | — | — | — | — |
| Co-stabilizer | 0.106 | 0.106 | — | — | — | — | — |
| PROPERTIES |  |  |  |  |  |  |  |
| Izod Notched Impact (23° C.) | 900.0 | 142.0 | 857.5 | 850.5 | 888.5 | 824.5 | 815.0 |
| Izod Notched Impact at 0° C. (J/m) | 205.5 | — | 846.0 | 836.0 | 843.5 | 797.0 | 816.5 |
| Izod Notched Impact at −10° C. (J/m) | — | — | 816.9 | 820.5 | 850.0 | 793.0 | 791.5 |
| Izod Notched Impact at −20° C. (J/M) | 165.5 | 116.5 | 184.5 | 204.0 | 197.0 | 452.5 | 765.5 |
| MVR at 300° C./1.2 kg (ml/10 min) | 5.7 | 12.5 | 9.9 | 11.1 | 10.0 | 10.2 | 10.0 |
| Transmission (2.0 mm) | 30.3 | 28.2 | 35.4 | 39.1 | 35.1 | 32.7 | 30.2 |
| Haze (2.0 mm) | 100.1 | 100.2 | 100.3 | 100.3 | 100.3 | 100.3 | 100.3 |
| Yellowness Index (YI) | 31.5 | 41.0 | 31.5 | 24.6 | 28.8 | 30.3 | 31.5 |

While preferred embodiments have been shown and described, various modifications and substitutions may be made thereto without departing from the spirit and scope of the invention. Accordingly, it is to be understood that the present invention has been described by way of illustration and not limitation.

All cited patents and other references are incorporated herein by reference in their entirety.

What is claimed is:

1. A molded translucent thermoplastic composition, comprising:
    about 60 to about 99.8 weight percent of an aromatic polycarbonate;
    about 0.1 to about 30 weight percent of a cycloaliphatic polyester comprising recurring units of the formula

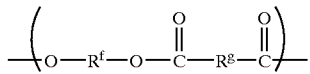

wherein $R^f$ represents an alkyl or cycloalkyl radical having 2 to about 12 carbon atoms, and $R^g$ is an alkyl or a cycloalkyl radical having 2 to about 12 carbon atoms with the proviso that at least one of $R^f$ or $R^g$ comprises a cycloalkyl group; and
    about 0.1 to about 8 weight percent of a polyolefin;
    wherein the molded composition has a transmission of about 15 to about 65% as measured on a 2.0 mm thick plaque; and wherein all weight percentages are based on the weight of the total composition.

2. The composition of claim 1, wherein the aromatic polycarbonate is derived from at least one dihydric phenol selected from the group consisting of 1,1-bis(4-hydroxyphenyl)methane; 1,1-bis(4-hydroxyphenyl)ethane; 2,2-bis(4-hydroxyphenyl)propane; 2,2-bis(4-hydroxyphenyl)butane; 2,2-bis(4-hydroxyphenyl) octane; 1,1-bis(4-hydroxyphenyl)propane; 1,1-bis(4-hydroxyphenyl)-n-butane; bis(4-hydroxyphenyl) phenylmethane; 2,2-bis(4-hydroxy-1-methylphenyl) propane; 1,1-bis(4-hydroxy-t-butylphenyl)propane; 2,2-bis(4-hydroxy-3-bromophenyl)propane; 1,1-bis(4-hydroxyphenyl)cyclopentane; and 1,1-bis(4-hydroxyphenyl)cyclohexane.

3. The composition of claim 2, wherein the at least one dihydric phenol comprises 2,2-bis(4-hydroxyphenyl) propane.

4. An article comprising the composition of claim 1.

5. A translucent sheet comprising the composition of claim 1.

6. The composition of claim 1, wherein the aromatic polycarbonate and the cycloaliphatic polyester are miscible.

7. The composition of claim 1, wherein the polyolefin is derived from at least one monomer having from 2 to about 10 carbon atoms.

8. The composition of claim 1, wherein the polyolefin comprises a linear low-density polyethylene.

9. The composition of claim 1, having a yellowness index measured according to ASTM D1925 on a 2.0 mm plaque not greater than about 35.

10. The composition of claim 1, wherein the polyolefin comprises about 20 to about 40 weight percent acid-modified polyolefin.

11. The composition of claim 1, further comprising a transesterification quencher selected from the group consisting of mono-, di-, and tri-hydrogen phosphites and their metal salts; mono-, di-, and tri-hydrogen phosphates and their metal salts; mono- and di-hydrogen phosphonates and their metal salts; pyrophosphates and their metal salts; and mixtures comprising at least one of the foregoing quenchers.

12. The composition of claim 11, wherein the catalyst quencher comprises mono zinc phosphate.

13. The composition of claim 11, wherein the catalyst quencher comprises phosphorous acid.

14. The composition of claim 1, further comprising at least one additive selected from the group consisting of whitening agents, thermal stabilizers, antioxidants, light stabilizers, plasticizers, colorants, impact modifiers, extenders, antistatic agents, mold releasing agents, additional resins, blowing agents, and processing aids.

15. The composition of claim 1, having a transmission measured on a 2.0 mm thick plaque of about 15 to about 55%.

16. The composition of claim 1, having a haze measured on a 2.0 mm thick plaque not less than about 90%.

17. The composition of claim 1, having an Izod Notched Impact Strength measured at 0° C. according to ASTM D256 not less than, about 500 J/m.

18. The composition of claim 1, having an Izod Notched Impact Strength measured at 0° C. according to ASTM D256 not less than about 700 J/m.

19. The composition of claim 1, having an Izod Notched Impact Strength measured at 0° C. according to ASTM D256 not less than about 800 J/m.

20. A molded translucent thermoplastic composition, comprising:
   about 60 to about 99.8 weight percent of an aromatic polycarbonate;
   about 0.1 to about 30 weight percent of a cycloaliphatic polyester comprising poly(1,4-cyclohexanedimethanol-1,4-cyclohexanedicarboxylate); and
   about 0.1 to about 8 weight percent of a polyolefin;
   wherein the molded composition has a transmission of about 15 to about 65% as measured on a 2.0 mm thick plaque; and wherein all weight percentages are based on the weight of the total composition.

21. A molded translucent thermoplastic composition, comprising:
   about 75 to about 95 weight percent of an aromatic polycarbonate;
   about 5 to about 15 weight percent of a cycloaliphatic polyester;
   about 0.5 to about 3 weight percent of a polyolefin plastomer;
   wherein the molded composition has a transmission of about 25 to about 50% as measured on a 2.0 mm thick plaque; and wherein all weight percentages are based on the weight of the total composition.

22. A molded translucent thermoplastic composition, comprising the reaction product of:
   about 60 to about 99.8 weight percent of an aromatic polycarbonate;
   about 0.1 to about 30 weight percent of a cycloaliphatic polyester comprising recurring units of the formula

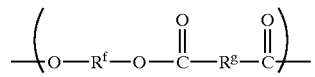

wherein $R^f$ represents an alkyl or cycloalkyl radical having 2 to about 12 carbon atoms, and $R^g$ is an alkyl or a cycloalkyl radical having 2 to about 12 carbon atoms with the proviso that at least one of $R^f$ or $R^g$ comprises a cycloalkyl group;
   about 0.1 to about 8 weight percent of a polyolefin;
   wherein the molded composition has a transmission of about 15 to about 65% as measured on a 2.0 mm thick plaque; and wherein all weight percentages are based on the weight of the total composition.

23. A method of preparing a translucent thermoplastic composition, comprising:
   premixing a composition comprising
      about 60 to about 99.8 weight percent of an aromatic polycarbonate;
      about 0.1 to about 30 weight percent of a cycloaliphatic polyester comprising recurring units of the formula

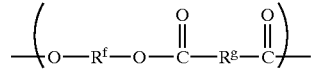

wherein $R^f$ represents an alkyl or cycloalkyl radical having 2 to about 12 carbon atoms, and $R^g$ is an alkyl or a cycloalkyl radical having 2 to about 12 carbon atoms with the proviso that at least one of $R^f$ or $R^g$ comprises a cycloalkyl group; and
      about 0.1 to about 8 weight percent of a polyolefin; to form a dry blend; and
   melt mixing the dry blend to form the thermoplastic composition;
   wherein the molded composition has a transmission of about 15 to about 65% as measured on a 2.0 mm thick plaque; and wherein all weight percentages are based on the weight of the total composition.

24. A molded translucent thermoplastic composition, comprising:
   about 60 to about 99.8 weight percent of an aromatic polycarbonate;
   about 0.1 to about 30 weight percent of a cycloaliphatic polyester; and
   about 0.1 to about 8 weight percent of a polyolefin, wherein the polyolefin comprises a polyolefin plastomer;
   wherein the molded composition has a transmission of about 15 to about 65% as measured on a 2.0 mm thick plaque; and wherein all weight percentages are based on the weight of the total composition.

* * * * *